United States Patent [19]

Deters

[11] 4,153,073
[45] May 8, 1979

[54] LIQUID DISPENSING AND VAPOR RECOVERY SYSTEM AND VALVE ASSEMBLY UTILIZED THEREIN

[75] Inventor: Elmer M. Deters, Muscatine, Iowa

[73] Assignee: Wylain, Inc., Dallas, Tex.

[21] Appl. No.: 854,686

[22] Filed: Nov. 25, 1977

Related U.S. Application Data

[63] Continuation of Ser. No. 721,771, Sep. 9, 1976, abandoned.

[51] Int. Cl.$^2$ .................. F16K 17/26; F16K 24/00
[52] U.S. Cl. ................................. 137/493.4; 141/59
[58] Field of Search ............. 137/493.3, 493.4, 493.5, 137/493.6; 141/46, 52, 59, 285, 290, 301, 302

[56] References Cited

U.S. PATENT DOCUMENTS 2,191,636  2/1940  Walker ..................... 137/493.4

Primary Examiner—Richard E. Aegerter
Assistant Examiner—Frederick R. Schmidt
Attorney, Agent, or Firm—Lane, Aitken & Ziems

[57] ABSTRACT

A liquid dispensing and vapor recovery system in which an underground storage tank applies gasoline to a dispenser located at a filling station or the like for dispensing the gasoline to a vehicle gasoline tank, under the force of a pump located in the storage tank. A vapor return line is provided for passing vapors in the vehicle tank through the dispenser and back to the storage tank. A valve assembly is utilized to permit the flow of vapor from the vehicle tank to the storage tank and to prevent the flow of vapor from the storage tank to the vehicle tank in the absence of a predetermined relatively high pressure.

3 Claims, 7 Drawing Figures

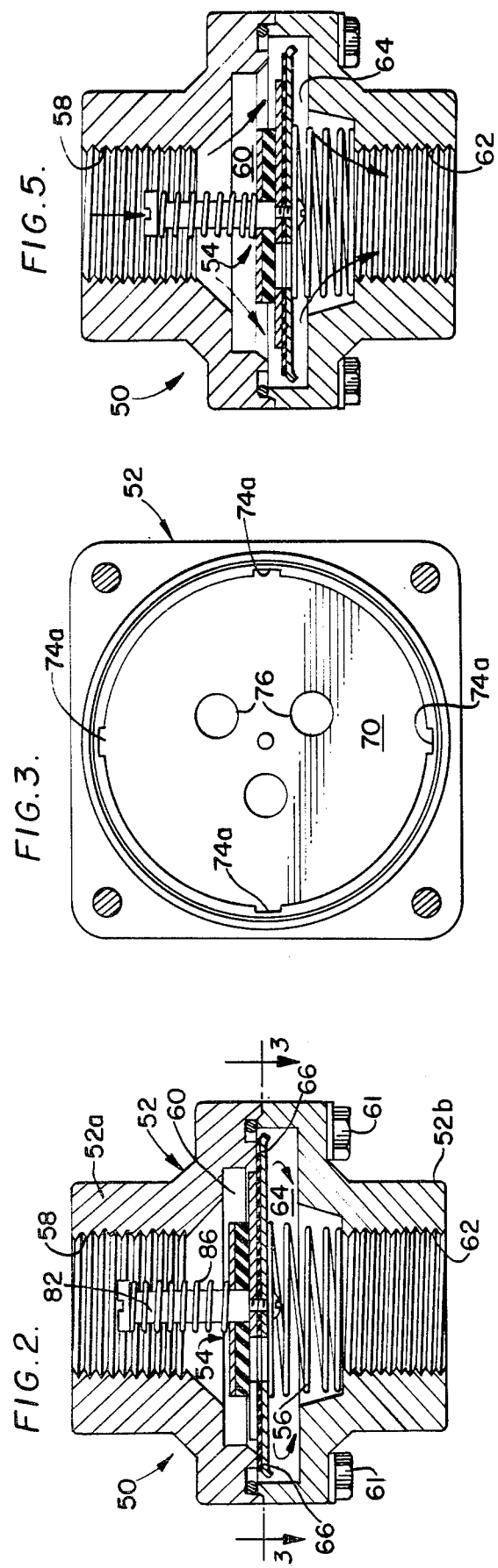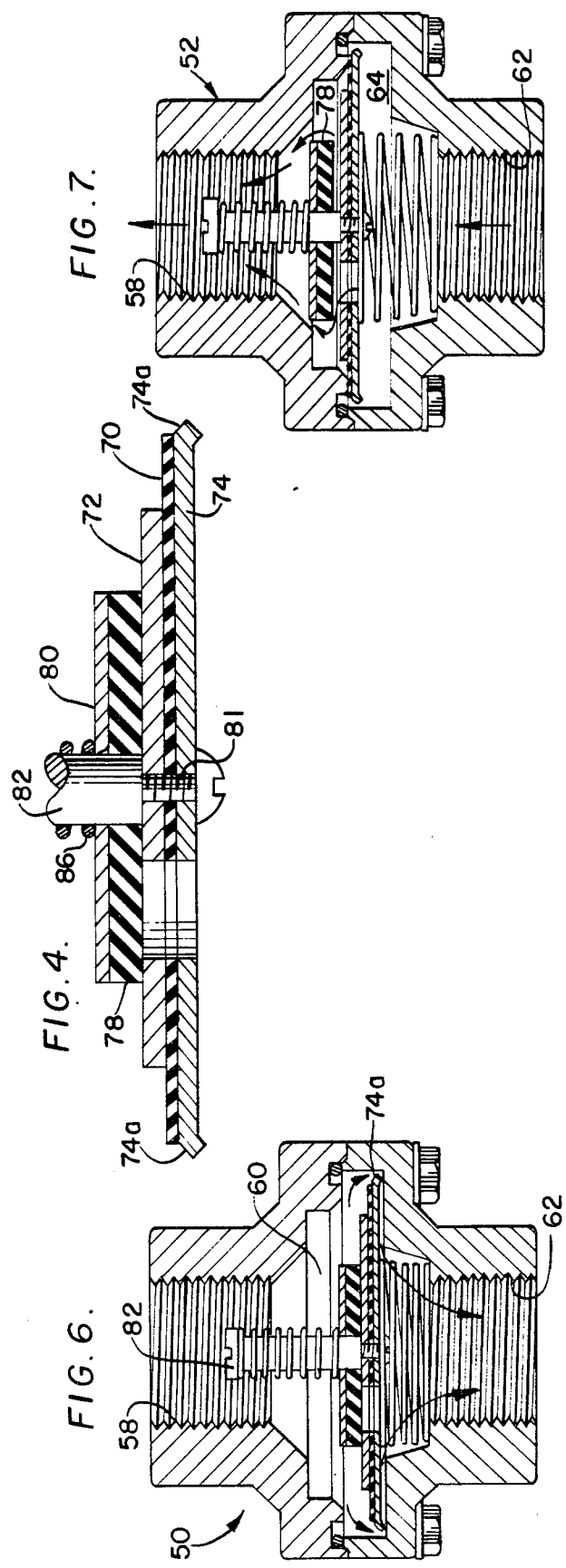

LIQUID DISPENSING AND VAPOR RECOVERY SYSTEM AND VALVE ASSEMBLY UTILIZED THEREIN

This application is a continuation of application Ser. No. 721,771, filed Sept. 9, 1976, now abandoned.

BACKGROUND OF THE INVENTION

This invention relates to a liquid dispensing and vapor recovery system and, more particularly, to such a system in which liquid is dispensed from a storage tank to a receptacle while vapors from the receptacle are drawn to the storage tank.

With the increased emphasis on preventing pollution of the atmosphere, recent attention has been directed to minimizing the introduction of gasoline vapors into the atmosphere from both permanent type underground storage tanks for the gasoline, and from the vehicles into which the gasoline is ultimately dispensed.

Gasoline vapors can easily be recovered from underground storage tanks by providing a separate vapor return line which connects the storage tank to the transport truck which periodically fills the tank. In this manner, the gasoline introduced into the tank from the transport truck will displace the vapors and force them through the vapor recovery line to the truck whereby they are ultimately disposed of either by burning or through compression-refrigeration systems.

One system that has been used for the purpose of recovering vapors from the gasoline tanks of vehicles is what is normally referred to as a balanced displacement system in which the gasoline entering the vehicle tank forces the vapors that accumulate in the latter tank through a separate line to the storage tank.

Another system that has recently evolved involves an injector, an aspirator, or the like which forms a reduced pressure zone in response to the gasoline flow from the storage tank, which reduced pressure zone is connected to the vehicle tank for drawing the vapor from the vehicle tank and returning same to the storage tank. An example of this type system is disclosed in U.S. Pat. Nos. 3,941,168, 3,952,781, 3,981,334 and 3,981,335.

In both of the foregoing systems, it is highly desirable that the vapor should pass from the vehicle tank to the storage tank in one of the aforementioned manners in response to a relatively very low pressure drop between the tanks. Also, the flow of vapor from the storage tank through the vapor line to the vehicle tank should be normally prevented but should be permitted in the event the pressure in the storage tank builds up to abnormally high levels, which may occur, for example, when gasoline is dispensed from a transport truck or the like into the storage tank.

SUMMARY OF THE INVENTION

It is, therefore, an object of the present invention to provide a liquid dispensing and vapor recovery system of the above type in which vapors in the vehicle tank are recovered and delivered back to the storage tank in response to a relatively very low pressure drop between the tanks while vapors are normally prevented from flowing from the storage tank to the vehicle tank.

It is a further object of the present invention to provide a liquid dispensing and vapor recovery system in which a valve assembly is disposed in the line connecting the vehicle tank to the storage tank and which responds to relatively low pressure drops between the tanks to permit the flow of fluid from the vehicle tank to the underground storage tank.

It is a still further object of the present invention to provide a liquid dispensing and vapor recovery system of the above type in which the above-mentioned valve assembly normally prevents the flow of vapor from the storage tank to the vehicle tank but will permit same in response to the existence of a predetermined relatively large pressure drop between the two tanks.

It is a still further object of the present invention to provide a valve assembly which responds to relatively low pressure drops for controlling the flow of fluid in a conduit.

It is a still further object of the present invention to provide a valve assembly of the above type which normally prevents flow of the fluid in a direction opposite the normal direction of fluid flow in a direction opposite the normal direction of fluid flow but permits fluid flow in said opposite direction in response to a relatively high pressure drop.

BRIEF DESCRIPTION OF THE DRAWINGS

FIG. 2 is a cross-sectional view of the valve assembly of the present invention;

FIG. 3 is a cross-sectional view taken along the line 3—3 of FIG. 2;

FIG. 4 is a partial, enlarged, sectional view of a portion of the assembly of FIG. 2; and FIGS. 5-7 are views similar to FIG. 2 but depicting different operational modes of the valve assembly of FIG. 2.

DESCRIPTION OF THE PREFERRED EMBODIMENTS

Figure 1:
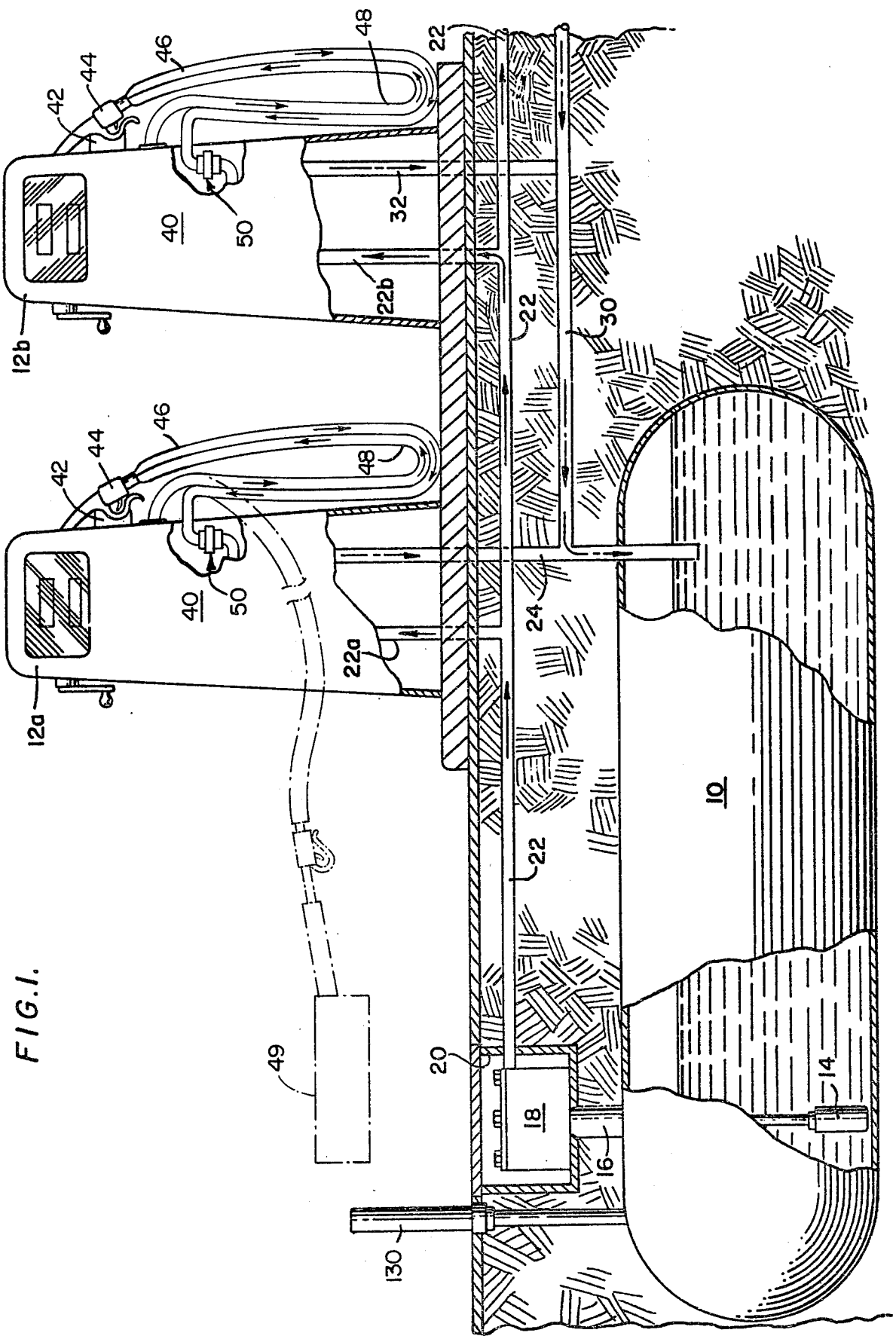
FIG. 1 is a partial schematic, partial elevational and sectional view of a service station installation incorporating the dispensing and vapor recovery system and valve apparatus of the present invention.

As an example of the use of the liquid dispensing and vapor recovery system of the present invention, it will be described in connection with a gasoline dispensing installation for use in service stations or the like. Such an installation is illustrated in FIG. 1 and includes an underground tank 10 for storing a quantity of gasoline which is delivered to two dispensing units, or pedestals, 12a and 12b. An electrically operated, centrifugal type submersible pump 14 is disposed in the tank and operates to draw the gasoline into the unit through a plurality of intake ports disposed at the bottom thereof, and to force the gasoline upwardly around a sealed electrical drive motor.

A casing 16 is attached to the tank 10 and extends upwardly therefrom to connect the outlet of the pump 14 to a discharge head, or manifold, 18 which is preferably disposed below ground level in a well 20. Since the manifold 18 forms no part of the present invention and is described in detail in U.S. Pat. No. 3,183,723, the disclosure of which is hereby incorporated by reference, its structural details are not shown in the drawings, it being understood that it supports the upper portion of the pump unit 14 while permitting the electrical connections for the drive motor to be brought outwardly for connection to the proper controls. It is also understood that an adapter unit, or packer, is supported within the housing of the manifold 18 and has an inlet chamber communicating with the outlet of the pump 14, an outlet chamber adapted for registration with a substantially horizontal main conduit 22, and a check valve to permit the flow of gasoline from the pump 14 to the conduit 22 while preventing flow in the opposite direction, also in a conventional manner. It is further understood that a leak detector is mounted on the above-mentioned packer and operates to detect any leakage of gasoline from the system.

A pair of substantially vertical branch conduits 22a and 22b connect the main conduit 22 to the pedestals 12a and 12b, respectively, for delivering the gasoline to the pedestals.

A substantially vertical vapor recovery conduit 24 extends from the pedestal 12a into the tank 10 and terminates in the upper portion of the tank. A horizontal vapor recovery conduit 30 is connected to the conduit 24, and to a substantially vertical conduit 32 extending from the pedestal 12b, so that vapor from the latter pedestal is introduced into the conduit 24 for passage into the tank 10. It is noted from the drawings that in installations having more than two pedestals, the conduits 22 and 30 can be extended to connect with other vertical conduits of the additional pedestals.

Each pedestal 12a and 12b consists of a housing 40 having a support and switch assembly 42 supported on its upper outer surface which is adapted to support a dispensing unit 44. Although not shown in the drawings, it is understood that the assembly 42 includes a switch which operates to actuate the pump unit 14 in a conventional manner.

Each dispensing unit 44 is connected to one end of a hose assembly consisting of a pair of juxtapositioned hoses 46 and 48. Although not shown in the drawings, it is understood that the latter hoses can be surrounded by a protective cover and that the dispensing unit 44 includes a gasoline dispensing nozzle connected to the hose 48 and a vapor recovery conduit connected to the hose 46. The other ends of the hoses 46 and 48 extend into the housing 40 for connection to the vapor recovery line (24 or 32) and the gasoline flow line (22a or 22b), respectively, in the following manner.

Each hose 46 extends through its respective housing 40 where it is connected to a valve apparatus 50 which will be described in detail later. In the case of a balanced displacement system the valve apparatus 50 would be connected to the storage tank 10, while in the case of an injector or aspirator system the valve apparatus 50 would be connected to the injector or aspirator, which, in turn would be connected to the tank 10.

In a similar manner each hose 48 extends through its respective housing 40 where it is connected via suitable meters, valves and the like, to the gasoline flow lines 22a or 22b. In the case of an injector or aspirator system, each hose 48 would be connected to its respective gasoline flow line 22a or 22b via a modulating valve and the aspirator or injector as disclosed in U.S. Pat. Nos. 3,941,168, 3,952,781, 3,981,334 and 3,981,335.

It is further understood that the dispensing unit 44 is operated by a manually operated valve in a conventional manner to dispense gasoline into a vehicle tank which is depicted schematically by the reference numeral 49.

Referring specifically to FIGS. 2 and 3, the valve apparatus 50 comprises, in general, a housing 52, a valve assembly shown in general by the reference numeral 54, disposed in said housing, and a helical spring 56 disposed in said housing and normally urging the valve assembly 54 toward a closed position.

The housing 52 comprises an upper portion 52a defining an internally threaded inlet passage 58 and an enlarged chamber portion 60 communicating with the passage 58, and a lower portion 52b attached to the upper portion 52a by bolts 61. An internally threaded outlet passage 62 is formed in the lower housing portion 52b along with an enlarged chamber portion 64 which communicates with the passage 62 and which, along with the chamber portion 60 of the upper housing portion 25a, defines a through chamber connecting the inlet passage 58 to the outlet passage 62.

It is noted from FIG. 1 that the inlet passage 58 is connected via suitable couplings, to the hose 46 it being understood that the outlet passage 62 can be connected via suitable couplings and additional components to the vapor recovery lines 24 or 32.

Referring again to FIG. 2, the internal portion of the upper housing portion 52a defining the chamber 60 is machined to define an annular valve seat 66 which cooperates with the valve assembly 54 to control the flow of fluid through the housing 50 as will be described in detail later.

The valve assembly 54 is disposed substantially within the chamber defined by the chamber portions 60 and 64 of the housing portions 52a and 52b, respectively, and is better depicted with respect to FIGS. 3 and 4. In particular, the valve assembly includes a relatively thin rubber disc 70 sandwiched between two aluminum washers 72 and 74, respectively. The diameters of the disc 70 and the washer 74 are substantially the same and are greater than that of the washer 72 so that the upper outer surface portion of the disc 70 is exposed. The washers 72 and 74 and the disc 70 each have three aligned openings formed therein which form three flow passages 76 for reasons that will be described in detail later.

The valve assembly 54 also includes a relief valve portion formed by a relatively thick rubber disc 78 pressed against the upper surface of the washer 72 by a backing washer 80. A threaded bolt 81 extends through aligned central openings provided through the washers 72 and 74 and the disc 70, and a rod 82 extends through aligned central openings extending through the disc 78 and the washer 80. The rod 82 has an internally threaded bore portion (not shown) for receiving the threaded bolt 81, with the bolt 81 and the rod 82 each being provided with slotted heads to facilitate their relative axial adjustment.

A spring 86 extends between the upper surface of the washer 80 and the lower surface of the head of the rod 82 to urge the washer 80 against the disc 78 which in turn forces the latter disc against the upper surface of the washer 72. Four outwardly projecting flanges 74a are provided at spaced intervals along the outer surface of the washer 74 and project outwardly therefrom and slightly downwardly, as viewed in FIG. 4, for reasons to be described in detail later.

Referring again to FIG. 2, the assembly consisting of the discs 70 and 78 and the washers 72, 74 and 80 are disposed in the chamber defined by the chamber portions 60 and 64 of the housing portions 52a and 52b, respectively, with the rod 82 and spring 86 extending within the inlet passage 58. The spring 56 is disposed in the lower housing portion 52b and within a corresponding shaped cavity forming a portion of the chamber portion 64, and normally urges the valve assembly 54 into an upward direction as viewed in FIG. 2 in which the exposed upper outer surface of the disc 70 engages the valve seat 66 to prevent the flow of fluid through the housing 52. It is noted that the entire valve assembly 54 is otherwise free floating, i.e. unrestrained, within the housing 52.

FIG. 5 depicts the valve assembly of FIG. 2 shown in an open position by virtue of its having moved downwardly in the housing 52 in response to a fluid pressure differential between the inlet passage 58 and the outlet passage 62 which, in the case of the vapor recovery system disclosed in FIG. 1, would be caused by the presence of a vapor in the hose 46 and, in the case of a system employing an aspirator or an injector, the existence of a negative pressure in the outlet passage 62. It is noted that the valve is designed to respond to a relatively low fluid pressure differential by virtue of the relatively large cross-sectional area of the valve portion of the valve assembly 54 relative to that of the inlet passage 58 in a plane perpendicular to the direction of flow through the housing 52.

In the open position of FIG. 5 the vapor passes from the inlet passage 58 through the chamber portion 60, around the outer surfaces of the washers 72, 74 and 80 and the discs 70 and 78, downwardly through the lower chamber portion 64 and through the outlet passage 62, as indicated by the flow arrows.

In the event a relatively large pressure differential occurs between the inlet passage 58 and the outlet passage 62, the valve assembly will move further downwardly in the housing 52 until the flanges 74a on the aluminum washer 74 engage the corresponding surface of the lower housing portion 52b defining a portion of the chamber 64 as shown in FIG. 6. In this position the lower surface of the washer 74 is slightly spaced from the latter surface to prevent a positive seal occuring in this mode, thus permitting the flow of the vapor around the outer edges of the washer 74.

As mentioned above, the valve apparatus 50 is designed to normally prevent flow from the outlet passage 62 to the inlet passage 58 but to permit said flow in the unlikely event that the pressure in the outlet passage 62 exceeds that in the inlet passage 58 by a relatively large amount, which could occur in the case of the vapor recovery system of FIG. 1 if abnormally large vapor pressures build up in the tank 10 during a filling operation. In the latter situation the valve assembly 54 would take the position shown in FIG. 7, i.e. with the upper sealing surface of the disc 70 engaging the valve seat 66 and with the disc 78 and its backing washer 80 elevated slightly upwardly relative to the washer 72 as a result of corresponding movement against the force of the spring 86 in response to a predetermined elevated pressure drop across the valve assembly. In this position, the passages 76 are exposed which permit the vapor to flow through the passages, around the outer edges of the disc 78 and the washer 80 and upwardly through the inlet passage 58, as shown by the flow arrows.

It is emphasized that the design including the relative sizes of the discs 74 and 78 and the forces applied by the springs 56 and 86 is such that the pressure differential required to move the valve assembly 54 from the position shown in FIG. 2 to the open position shown in FIG. 5 is much less than that required to move the disc 78 and washer 80 relative to the washer 72 in the opposite direction to the position shown in FIG. 7.

For example, the design can be such that a pressure drop of 1/10 inch of water pressure relative to a flow of 7½ gallons per minute of vapor is sufficient to permit the valve assembly 54 to open and permit the vapor to flow from the inlet passage 58 to the outlet passage 62, while a pressure of 2½ pounds per square inch is required to permit the flow of the vapor from the outlet passage 62 to the inlet passage 58, with the latter pressure, of course, being easily adjustable by simply varying the relative axial position of the bolt 81 and the rod 82.

It is understood that several variations may be made in the foregoing without departing from the scope of the invention. For example, the valve assembly is not limited to the use of the particular liquid dispensing and vapor recovery system described, and the latter is not limited to use in connection with a gasoline dispensing system.

Still other variations of the specific construction and arrangement of the system disclosed above can be made by those skilled in the art without departing from the invention as defined in the appended claims.

I claim:

1. A valve assembly for controlling the flow of fluid through a conduit comprising a housing defining an inlet passage for receiving fluid from said conduit, an outlet passage for discharging fluid to said conduit, and a chamber communicating said inlet passage and outlet passage to permit the fluid to flow from said inlet passage through said housing to said outlet passage; a valve seat disposed in said chamber; valve means disposed in said chamber in the path of said fluid and adapted to cooperate with said valve seat for controlling the fluid flow through said housing; and resilient means disposed in said housing for urging said valve means against said seat to prevent the flow of fluid through said housing, said valve means comprising first and second discs of a relatively thin rigid material, a third disc of a relatively thin elastic material sandwiched between said first and second discs, and means permanently securing said third disc between said first and second disc, the diameter of said third disc being greater than that of at least one of said first and second discs so that said elastic material is exposed to said valve seat for engaging same, said discs moving in said chamber against the force of said resilient means in a direction away from said valve seat in response to the fluid pressure differential across said valve means exceeding a predetermined value; a relief valve assembly including a guide member having one end secured to said valve means, said guide member extending outwardly of said valve means toward said inlet, a valve element mounted on said guide member for sliding movement relative to said guide member to and away from said valve means and resilient urging means for resiliently urging said valve element towards said valve means to cover a through opening in said valve means; said valve element moving relative to said guide member against the force of said resilient urging means to uncover said opening in response to fluid pressure in said outlet passage exceeding the fluid pressure in said inlet passage by a predetermined valve.

2. The assembly of claim 1, wherein the cross-sectional area of the portion of said valve means exposed to said fluid flow in a plane perpendicular to the direction of fluid flow through said housing is greater than that of said inlet passage and said outlet passage.

3. The assembly of claim 1, further comprising an additional valve seat disposed in said chamber in a spaced relation to the first valve seat, and stop means cooperating with said valve means and said additional valve seat for seating said valve means in a predetermined spaced relationship to said additional valve seat in response to a predetermined maximum fluid pressure differential occurring across said valve means and permitting a predetermined fluid flow through said housing.

* * * * *